Figure 1:
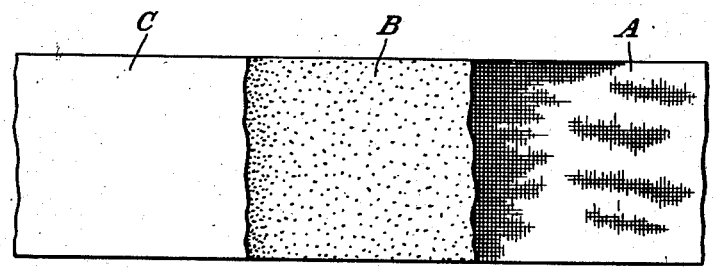

Feb. 4, 1947.  D. J. BUCKLEY ET AL  2,415,276
ADHESIVE MATERIAL
Filed Oct. 30, 1942

INVENTORS.
DONALD J. BUCKLEY
BY ROBERT L. SMITH
ATTORNEY

Patented Feb. 4, 1947

2,415,276

UNITED STATES PATENT OFFICE 2,415,276

ADHESIVE MATERIAL

Donald J. Buckley, North Plainfield, N. J., and Robert L. Smith, Otego, N. Y., assignors to Industrial Tape Corporation, North Brunswick, N. J., a corporation of New Jersey Application October 30, 1942, Serial No. 463,900

5 Claims. (Cl. 117—76)

1

This invention relates to adhesive materials of the character having a flexible woven fabric backing with a normally tacky adhesive united thereto, as for instance, pressure sensitive tapes for use as surgical dressings, insulating wrappings, decorative and other wall coverings, and for many other purposes.

In the manufacture of such tapes it has been the custom to apply the adhesive mass to the woven fabric either by calendering the mass directly on to one surface thereof or by coating the surface with a dispersion or solution containing the mass and then evaporating the solvent. Regardless of the process used, however, a good tape as heretofore made required that the mass be worked into the interstices of the fabric to anchor the backing and the mass together, thus to avoid separation of the mass and the fabric as the tape is stripped from the roll in which it is usually wound, or to prevent retention of the mass on the surface to which the tape has been applied in use, should it become necessary to strip the tape from the surface after it has served its intended purpose.

It is obvious that when the mass is applied directly to a fabric backing, a large portion of it serves merely to anchor the mass to the fabric and is not effective as an adhesive in securing the tape in place. In other words, the portion of the adhesive mass embedded in the interstices of the fabric does not aid in causing the tape to adhere to the surface to which it is applied. Since the adhesive masses usually used contain a large percentage of rubber which is expensive in itself and expensive also to process to a condition suitable for use as an adhesive, the resultant tape is relatively high in cost.

In some instances, it is undesirable to have the adhesive mass penetrate the fabric and some tapes have been made with that in view but it has been found that the slight pressure within a roll of such tape is sufficient (in the absence of some means of preventing it) to cause penetration of the adhesive into the fabric with the result that after a short period, the tape loses much of its effectiveness.

Mainly for the purpose of preventing the adhesive mass from permeating through to the back or uncoated side of the fabric, it has been proposed to place between the fabric and the layer of adhesive, an intermediate coating composed of a suitable rubber composition which, when vulcanized, will serve to prevent the adhesive from passing into the fabric's interstices. While that expedient might effect a saving in the amount of adhesive used, it would effect no saving in cost; indeed it might result in a more expensive product because of the degree to which the rubber compound would have to be processed, particularly if it contained a filler. There would also

2 be the possibility that such vulcanizing agents as were not utilized in the vulcanizing process would migrate into the adhesive mass, tending to vulcanize the latter and rendering the tape unfit for use in a comparatively short period of time.

In accordance with the present invention there is provided an adhesive material comprising a flexible woven fabric and a pressure sensitive adhesive with an interposed barrier coat containing a polyaliphaticolefin as, for instance, polyisobutylene which is sold under the trade names Vistanex and Synthetic "100," and a large proportion of filler, the barrier coat being deposited on one surface of the fabric prior to the application of the adhesive mass. While the improved barrier coat may be calendered on to the surface of the fabric, it is preferred to disperse the polyisobutylene and the filler together with other materials referred to hereinafter, in a suitable solvent, spread the solution evenly on the surface of the fabric backing, and then evaporate the solvent, thereby leaving on said surface a thin, uniform, unbroken film composed of the materials just mentioned. While the film will adhere firmly to the surface of the fabric and also to the adhesive mass when the latter subsequently is applied, nevertheless it does not enter into the interstices of the fabric and, as it possesses a certain amount of tensile strength, it will not be broken either during the application of the adhesive or when subsequently the tape is applied to a surface in use. Thus under all normal circumstances either during the manufacture of the tape or in service, the barrier coat will effectively prevent the adhesive mass from entering the interstices of the fabric.

Polyisobutylene, the preferred film forming constituent, can be manufactured with molecular weights ranging from a low of about six thousand (6,000) or less to a high of about two hundred thousand (200,000), and, depending upon the molecular weight, the material possesses different degrees of plasticity, that of the lower molecular weights having a high degree of plasticity characterized by a substantial amount of cold flow, whereas that of the higher molecular weights has a low degree of plasticity characterized by being relatively stiff.

When polyisobutylene is used as the film forming constituent, a selected portion only of its range of molecular weights is preferred. In other words, the film forming material should not be so soft or plastic as to lack the necessary firmness to serve as a barrier coat, whereas, on the other hand, it should not be so stiff as to interfere with the flexibility of the finished tape or to lack the properties of taking up the desired amount of filler. Polyisobutylene in the range of molecular weights from eighty thousand (80,000) to one hundred twenty thousand (120,-

000) may be utilized to the best advantage although this range is not given by way of limitation since in actuality the type of polyisobutylene selected will depend to some extent upon the amount of filler it is desired the film should contain and upon other considerations which will be readily apparent to those skilled in the art.

Among the advantages of polyisobutylene in so far as this invention is concerned is its ability to be heavily loaded with a filler without a resultant loss in plasticity as would be the case if rubber were used with the same amount of filler because of the extent to which the rubber would have to be milled in the compounding process. Furthermore, since there are no vulcanizing or accelerating agents present in the film as it is applied to the fabric backing, the danger of migration of such agents into the adhesive mass is nonexistent. Other advantages in the use of polyisobutylene are its excellent aging characteristics, its resistance to oxidation, its excellent electrical characteristics, its ability to resist the action of many organic solvents and acids, and its low water absorption.

While many fillers could be used with polyisobutylene in the manufacture of the improved barrier coat, Witco clay #2 is preferred. This clay is well known to those in the rubber industry and is characterized by its purity and by its low oil absorption and correspondingly low "drying" action. The clay filler imparts firmness to the barrier coat and renders it low in cost because of the large amount that can be used with the suggested film material.

For the purpose of anchoring the barrier coat to the fabric backing and for the purpose also of presenting a surface to which the adhesive mass will readily adhere, a nonoxidizing resin compatible with the film forming material and also with the adhesive mass is used in the barrier coat compound. By way of example, ester gum is suggested as well as the hydrogenated rosin "Staybelite" or esters thereof or the modified rosin "Galex," the principal constituent of which is dehydroabietic acid.

As previously stated, the barrier coat may be calendered on the fabric or it may be laid down upon the fabric in the form of a solution. Any suitable solvent may be used, toluene, heptane, hexane and benzene being suggested by way of example.

Regarding the adhesive, any of the pressure sensitive adhesive masses, as, for instance, those containing crude rubber or reclaimed rubber, may be used. These masses may be calendered onto the barrier coat or spread on in the form of a dispersion in a suitable solvent which is later evaporated.

In actual practice, excellent adhesive tapes have been manufactured with a barrier coat of the following composition which is given purely by way of example:

*Example*

| | Parts |
|---|---|
| Polyisobutylene (molecular weight about 100,000) | 300 |
| Witco clay #2 | 600 |
| Ester gum | 120 |
| Lanolin | 4 |
| Solvent (toluene) | 606 |

The polyisobutylene, the Witco clay #2 and the lanolin were compounded in a Banbury mixer. This compound was then dispersed with the ester gum and the solvent in an internal mixer. This mixture then was spread upon the surface of a cloth backing of the square woven variety having 80 threads to the inch both ways, and the solvent evaporated. One ounce of the mixture (dry weight) was used per square yard. The barrier coated cloth was then coated with three ounces per square yard of adhesive mass. When it is considered that an adhesive material without a barrier coat but having the same adhesive properties would require from five to six ounces of adhesive mass per square yard, the excess over three ounces serving merely to anchor the mass to the fabric, the substantial savings that can be effected by the practice of the invention will be manifest.

It will be understood, of course, that the proportions in the example given above could be varied over a substantial range. Thus, with reference to the polyisobutylene, the clay and ester gum could be varied at least plus and minus twenty percent and ten percent respectively. Variations in the character of the polyisobutylene would permit of further variations in the proportions of the other ingredients used.

Figure 2:
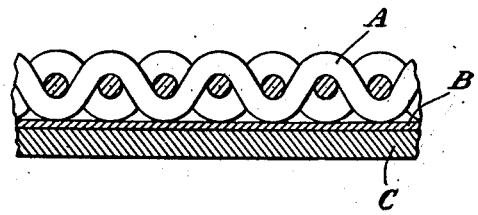

Referring to the drawing:

Fig. 1 is a plan view of an adhesive tape in which the present improvements are incorporated, the upper layers of the tape being broken away to show the layer next below; and Fig. 2 is an enlarged cross-sectional view of the adhesive tape shown in Fig. 1.

In the different figures there is shown a flexible woven fabric backing member A filmed with a barrier coat B to which a layer C of adhesive mass has been applied. As shown in Fig. 2 the barrier coat B spans or bridges the gaps between the threads of the backing member and does not enter into the interstices thereof. In other words, the barrier coat is substantially uniform in thickness and presents a surface which deviates only slightly from what otherwise would be a relatively flat surface and to which the layer of adhesive mass will readily adhere. A barrier coat of this character will insure an adhesive layer of substantially uniform thickness. Furthermore, the layer C in its entirety will function as an adhesive, no portion thereof being utilized for any other purpose as, for instance, to anchor the mass to the fabric backing as would be the case in the absence of a barrier coat.

An adhesive tape made in accordance with the present improvements has greater tensile strength than a tape made from the same backing material but devoid of a barrier coat. It would seem that the tensile strength of the barrier coat and of the backing member are additive in effect. In addition, there are economies derived from a saving in the amount of adhesive used, which is relatively expensive, and from a saving in the cost of processing, at least if the improved tape, as regards the latter factor, be compared with other tapes having a barrier coat which has to be subjected to a process of vulcanizing.

From the foregoing description, it will be apparent that the instant invention may be subject to many modifications or changes within its scope. It will be understood, therefore, that the invention is to be limited only by the prior art and the appended claims.

Having thus described the invention, what is claimed is:

1. As an article of manufacture, an adhesive material having a flexible backing presenting interstices throughout at least one of its surfaces, a normally tacky pressure-sensitive adhesive mass united to the surface presenting the interstices, and a firm yet flexible and substantially non-tacky intermediate barrier layer presenting a uniform surface to receive the adhesive mass and serving to prevent said mass from entering the interstices of the backing, said barrier layer comprising major proportions of polyisobutylene and a filler inert to the adhesive mass.

2. As an article of manufacture, an adhesive material having a flexible backing presenting interstices throughout at least one of its surfaces, a normally tacky pressure-sensitive adhesive mass united to the surface presenting the interstices, and a firm yet flexible and substantially non-tacky intermediate barrier layer presenting a uniform surface to receive the adhesive mass and serving to prevent said mass from entering the interstices of the backing, said barrier layer comprising polyisobutylene, a filler inert to the adhesive mass, and a compatible non-oxidizing resin.

3. As an article of manufacture, an adhesive material having a flexible backing presenting interstices throughout at least one of its surfaces, a normally tacky pressure-sensitive adhesive mass united to the surface presenting the interstices, and a firm yet flexible and substantially non-tacky intermediate barrier layer presenting a uniform surface to receive the adhesive mass and serving to prevent said mass from entering the interstices of the backing, said barrier layer comprising polyisobutylene, a filler inert to the adhesive mass and a non-oxidizing adhesive augmenting resin compatible with the polyisobutylene and with the pressure-sensitive adhesive mass.

4. As an article of manufacture, an adhesive material having a flexible backing presenting interstices throughout at least one of its surfaces, a normally tacky pressure-sensitive adhesive mass united to the surface presenting the interstices, and a firm yet flexible and substantially non-tacky intermediate barrier layer presenting a uniform surface to receive the adhesive mass and serving to prevent said mass from entering the interstices of the backing, said barrier layer comprising polyisobutylene having a molecular weight in the range 80,000 to 120,000, filler inert to the adhesive mass and a compatible non-oxidizing resin, said polyisobutylene, filler and resin being present respectfully in the proportions by weight 300, 600 plus or minus 20% and 100 plus or minus 10%.

5. As an article of manufacture, an adhesive material having a flexible backing presenting interstices throughout at least one of its surfaces, a normally tacky pressure sensitive adhesive mass united to the surface presenting the interstices, and a firm yet flexible and substantially non-tacky intermediate barrier layer presenting a uniform surface to receive the adhesive mass and serving to prevent said mass from entering the interstices of the backing, said barrier layer comprising polyisobutylene and a clay filler in excess of the polyisobutylene by a substantial amount.

DONALD J. BUCKLEY.
ROBERT L. SMITH.

REFERENCES CITED

The following references are of record in the file of this patent:

UNITED STATES PATENTS

| Number | Name | Date |
|---|---|---|
| 2,269,214 | Luitwieler | Jan. 6, 1942 |
| 2,142,039 | Abrams, et al. | Dec. 27, 1938 |
| 2,352,463 | Wenzelberger | June 27, 1944 |
| 2,142,039 | Abrams, et al. | Dec. 27, 1938 |

FOREIGN PATENTS

| Number | Country | Date |
|---|---|---|
| 377,572 | British | July 28, 1932 |

OTHER REFERENCES

Vistanex Polybutene: Published by Advance Solvents and Chemical Corp. (New York), Nov. 12, 1940.

Paper Coatings and Adhesives: Published by Advance Solvents & Chemical Corp. (N. Y.). Rec'd in Div. 38 Nov. 5, 1941. Copies in 117-RLP.

Ex parte Hill 1924 C. D. 21; O. G. 707. Naamlooze v. Coe 545 O. G. 675, Smith v. Nichols 88, U. S. 112.